Aug. 9, 1932.  C. W. JAMESON  1,870,512
APPARATUS FOR TESTING THE EFFECT OF WEATHER UPON OBJECTS
Original Filed Jan. 13, 1927   5 Sheets-Sheet 1
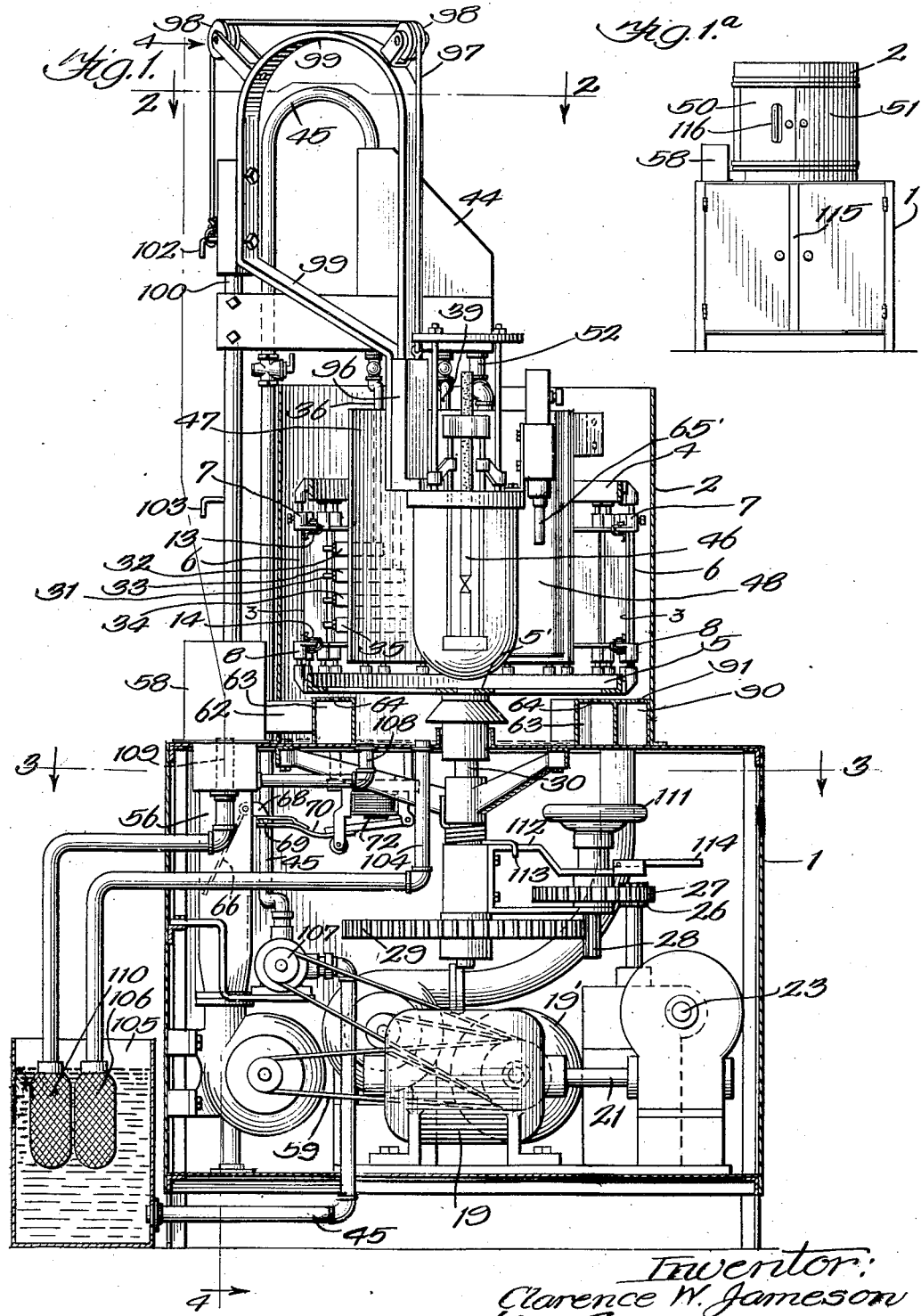

Aug. 9, 1932.  C. W. JAMESON  1,870,512
APPARATUS FOR TESTING THE EFFECT OF WEATHER UPON OBJECTS
Original Filed Jan. 13, 1927   5 Sheets-Sheet 2
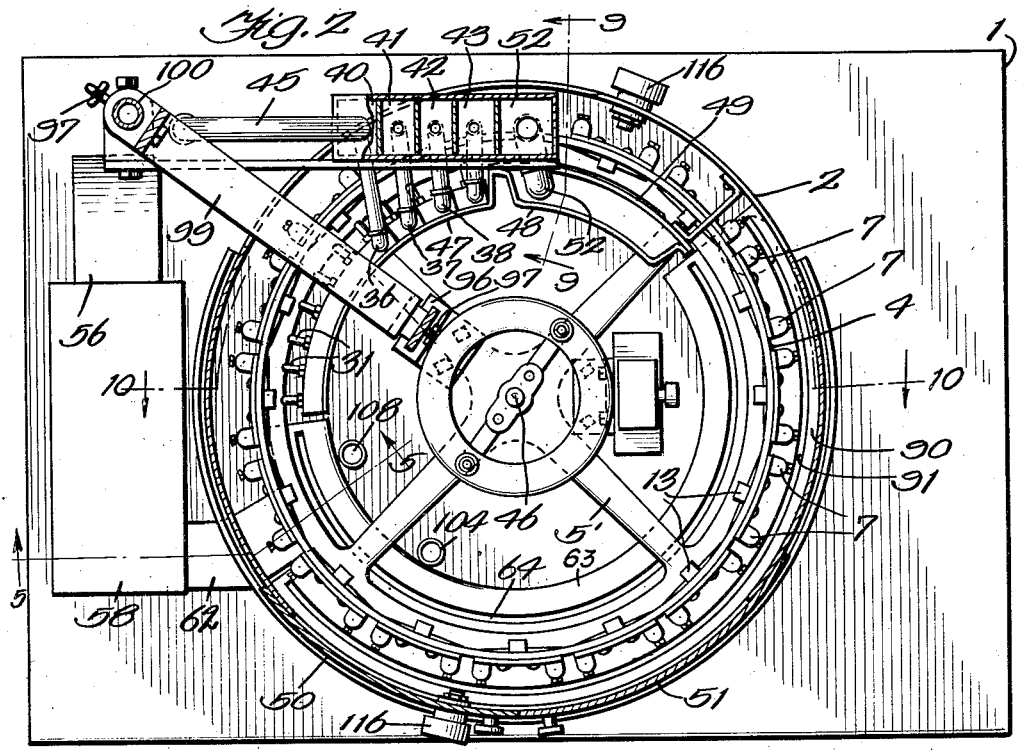
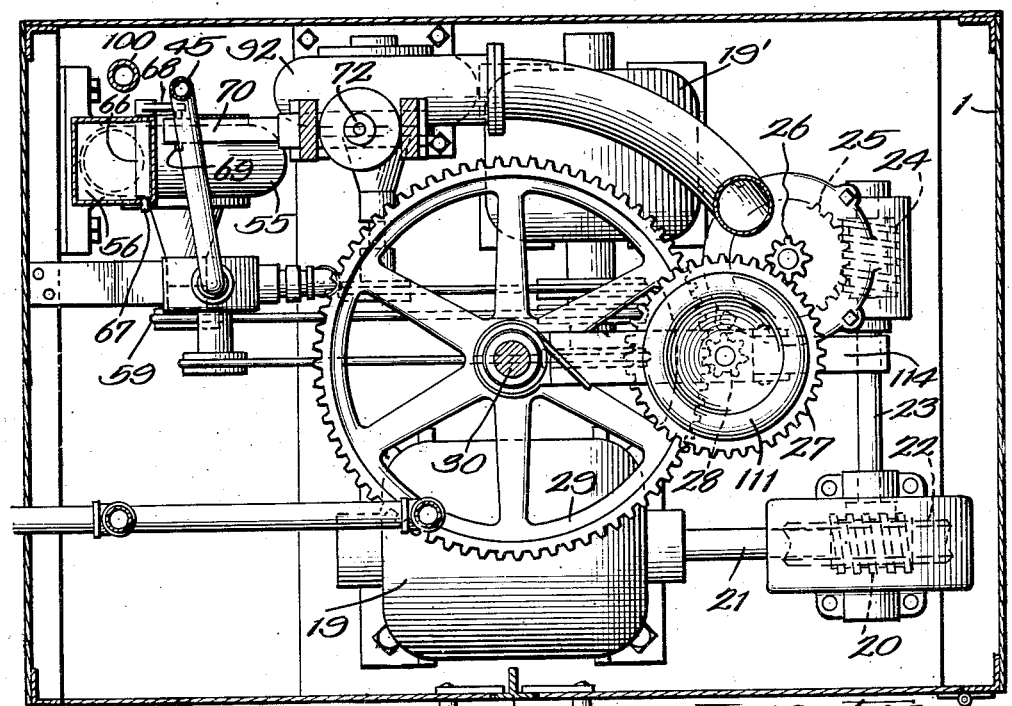

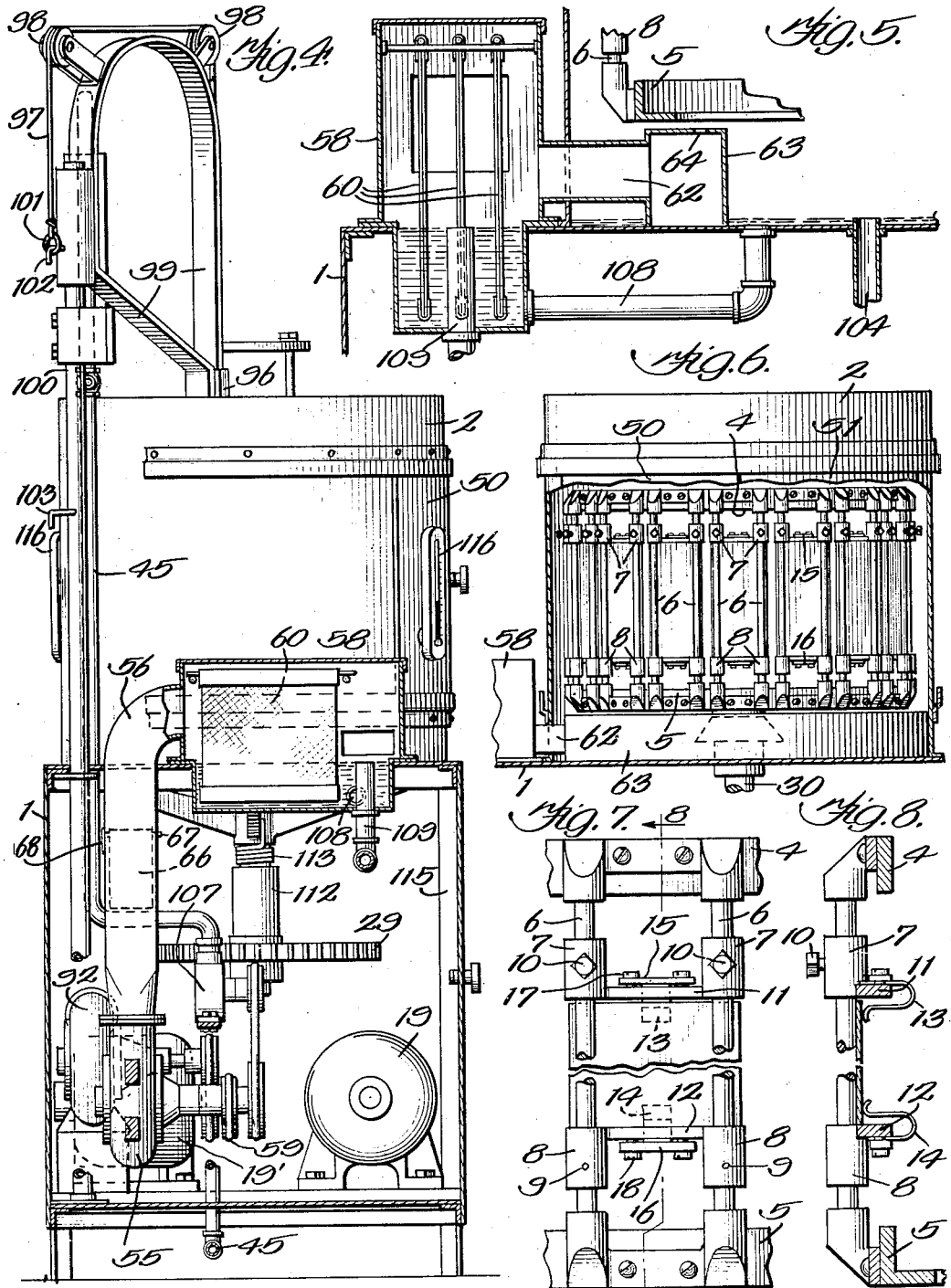

Aug. 9, 1932.　　　C. W. JAMESON　　　1,870,512
APPARATUS FOR TESTING THE EFFECT OF WEATHER UPON OBJECTS
Original Filed Jan. 13, 1927　　5 Sheets-Sheet 4
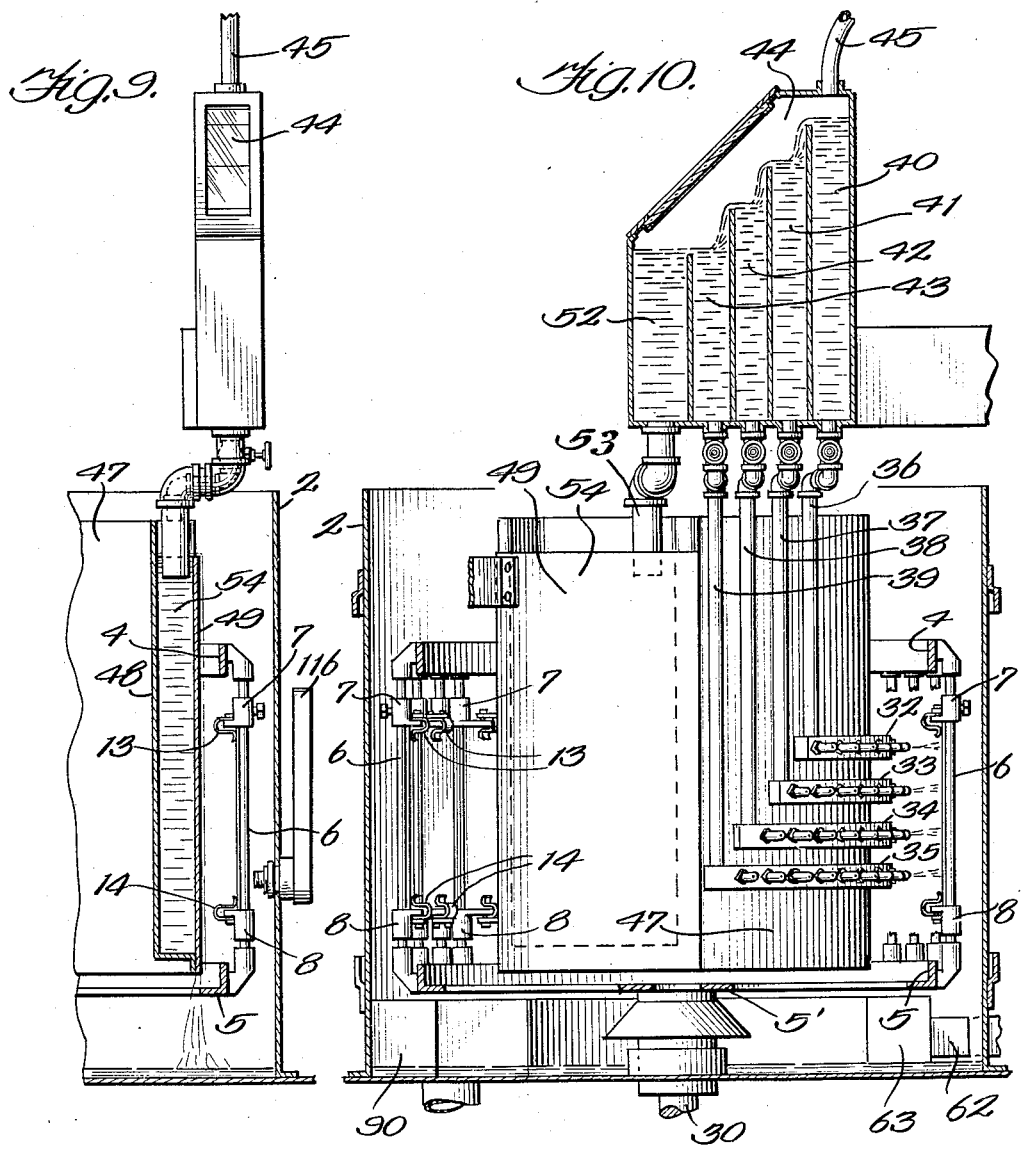
Inventor:
Clarence W. Jameson

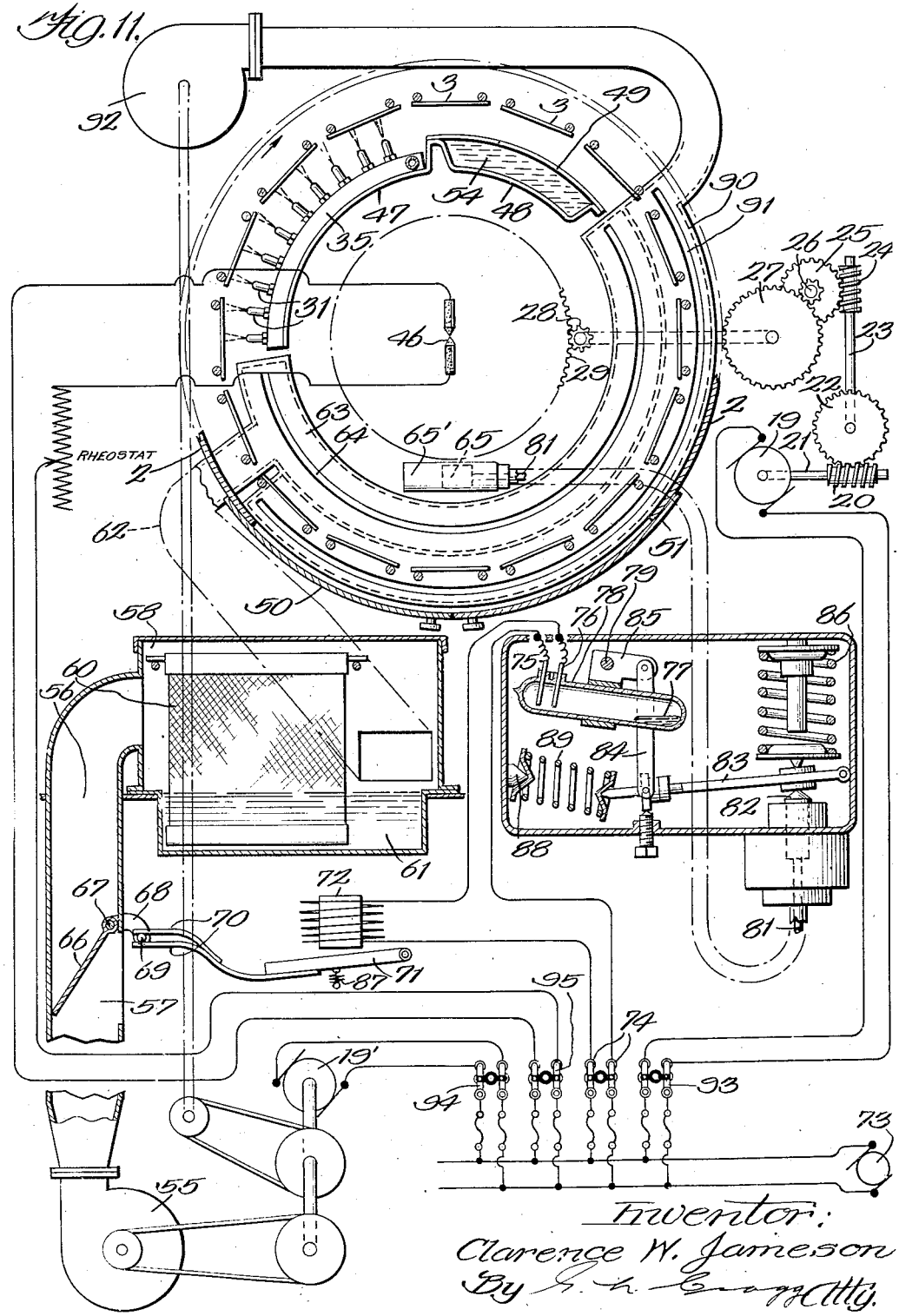

Patented Aug. 9, 1932

1,870,512

UNITED STATES PATENT OFFICE

CLARENCE W. JAMESON, OF CHICAGO, ILLINOIS, ASSIGNOR TO ATLAS ELECTRIC DEVICES CO., OF CHICAGO, ILLINOIS, A CORPORATION OF ILLINOIS

APPARATUS FOR TESTING THE EFFECT OF WEATHER UPON OBJECTS

Application filed January 13, 1927, Serial No. 161,010. Renewed March 10, 1932.

My invention relates to apparatus for testing the effect of weather upon objects. I have actually embodied my invention in an apparatus for testing the effect of weather upon sheets of iron or steel, though the invention is not to be limited to the nature of the objects undergoing test.

My invention resides in employing, in association, means for artificially producing weather producing factors simulating those that occur in nature and in providing facility for subjecting the object undergoing test to the effect of these artificially produced weather producing factors.

The preferred form of apparatus of my invention includes, in association, means for spraying or otherwise wetting an object to be tested with water, a heat generating lamp which produces artificial light containing rays, such as ultra violet rays, whose effect is to be tested and arranged to direct its light and heat upon the object, an artificial source of atmospheric humidity arranged to effect the object, and means, preferably in the form of a shield, enabling the object to be subject to the wetting means without being subject to the light and to the light without being subject to the wetting means. When the apparatus embraces all of these weather simulating factors, the shield is preferably employed, there then being a positioner for the object, the shield and object positioner being in movable relation, for the purpose stated. Means are also desirably employed for regulating the degree of heat to which the object is subject and this means is preferably inclusive of a chamber that enters into the construction of the shield and which chamber contains cooling fluid.

I will explain my invention more fully by reference to the accompanying drawings in which Fig. 1 is a view in sectional elevation of the preferred embodiment of the invention; Fig. 1ª is a view in elevation, on a smaller scale, of the structure shown in Fig. 1; Fig. 2 is a sectional view on line 2—2 of Fig. 1, some parts being sectionally shown that are not cut by the section line; Fig. 3 is a sectional view on line 3—3 of Fig. 1; Fig. 4 is a sectional view on line 4—4 of Fig. 1; Fig. 5 is a sectional view on line 5—5 of Fig. 2; Fig. 6 is a front elevation of a part of the apparatus with portions shown in section; Fig. 7 is a view, on a larger scale, of part of the structure shown in Fig. 6, with parts of the structure broken away; Fig. 8 is a sectional view on line 8—8 of Fig. 7; Fig. 9 is a sectional view on line 9—9 of Fig. 2; Fig. 10 is a sectional view on line 10—10 of Fig. 2; and Fig. 11 is a diagrammatic view of the apparatus.

The main casing for the apparatus includes a lower compartment 1 whose sides are rectangular and a cylindrical compartment 2 supported upon the lower compartment. The artificial means for supplying the objects with light, heat and humidity are contained in the upper compartment and the motor mechanism and some of the regulating apparatus is contained in the lower compartment.

The objects undergoing test are illustrated at 3 being, for example, rectangular sheets of iron or steel. These objects are supported upon a positioner which is preferably inclusive of two rings 4 and 5 having a common vertical axis and upright rods 6 which are secured at their ends to these rings. Sleeves 7 and 8 are secured upon each rod, the lower sleeves being desirably fixedly secured in place by means of the pins 9 while the upper sleeves are adjustably secured upon the rods by means of the set bolts 10. The rods 6 are arranged in place, Fig. 7, the sleeves 7 upon each pair of rods being connected by the web 11 while the underlying sleeves 8 are connected by another web 12. Strip metal springs 13 and 14, of U-shape, are anchored to the webs 11 and 12 by means of the clamping plates 15 and 16 which are held in clamping relation by the screws 17 and 18. The free ends of the springs 13 and 14 intervene between each pair of webs 11 and 12 and extend into close proximity to the associate rods so that the objects 3 may be clamped by the springs against the corresponding rods. The positioner thus constructed and arranged is desirably rotated upon its vertical axis by means of the electric motor 19, power being transmitted from the motor to the object positioner by way of a worm screw 20 upon the motor driven shaft 21, a worm wheel 22 in mesh with the worm screw, a shaft 23 carrying the worm wheel, a worm screw 24 upon said shaft, a worm wheel 25 in mesh with the worm screw 24, a spur pinion 26 coaxial with and fixed with relation to the worm wheel 25, a spur gear 27 in mesh with the spur pinion 26, a spur pinion 28 coaxial with and fixed with relation to the spur gear 27, the spur gear 29 in mesh with the spur pinion 28, and the shaft 30 which is coaxial with the positioner whose lower ring 5 is assembled with this shaft by means of the spider 5' which carries the ring 5.

The means for spraying water upon the objects being tested, the artificial source of light and the shield for limiting the objects to be tested to either the action of the water spraying means or the action of the light are surrounded by the object positioner and the objects on the positioner. The water spraying means is desirably inclusive of several tiers of water ejecting nozzles 31 which are radially directed toward the inner sides of the objects being tested, there being enough of these nozzles to spread water completely upon the sides of the objects that are adjacent to the nozzles. Referring to Fig. 10, the nozzles in the various tiers are connected with headers 32, 33, 34 and 35 located at levels which correspond with the levels of the tiers of the nozzles. The headers are connected by means of pipes 36, 37, 38 and 39 respectively with water containing compartments 40, 41, 42 and 43 which are contained in a tank 44 to which the water is furnished through the water conveying pipe 45. Said water containing compartments are in cascade relation, as shown in Fig. 10, so that the water is ejected through all of the nozzles under the same pressure. The nozzles are arranged upon an arc that is coaxial with the object positioner, this arc extending about ninety degrees. An electric arc lamp 46 is arranged to have the adjacent ends of its arc producing carbons in the zone of the water spraying nozzles, the arc being desirably formed midway between the horizontal planes containing the upper and lower tiers of nozzles and being desirably located in the vertical axis of the object positioner. The degree of heat produced by the lamp is regulable by the rheostat 46' and also by the position to which the lamp is vertically adjusted by the adjusting means hereinafter described.

The lamp is designed to furnish artificial light containing the rays whose effect is to be tested, such as ultra violet rays. The light should be prevented from having effect upon the objects while the objects are being sprayed with water and should be permitted to have effect upon these objects shortly after the objects emerge from the spray. To this end I desirably employ a light obstructing shield which includes a thin imperforate arcuate plate 47 which is coaxial with the object positioner and which is interposed between the lamp and the spraying nozzles. This plate is circularly continued beyond the nozzles, as indicated at 48 to form a wall of a cooling chamber which also has a wall portion 49 and a bottom wall portion to complete the chamber, this chamber desirably including cooling fluid of sufficiently low temperature to cool the objects as they are turned in a clockwise direction from the range of the nozzles. The cooling fluid employed may be water. The shield thus provided between the lamp and the nozzles and continued beyond the nozzles in the direction of rotation of the object positioner extends considerably less than one hundred and eighty degrees (180 degrees) in order that the light emanating from the lamp may have sufficient matter to act upon the wet, dried, or partially dried surfaces of the objects undergoing test. The lamp, being an arc lamp, also furnishes heat which simulates the heat of the sun, this heat being reduced by the cooling fluid in the chamber 48, 49. The upper compartment 2 is provided with a suitable opening through which the objects may be placed upon their positioner and through which the objects may be withdrawn after the test, this opening being desirably provided with arcuate doors 50 and 51. From time to time these doors are opened to remove tested objects and to supply fresh objects for test, the doors being desirably closed during the testing operation.

Not only are the objects subject to the water spraying means and the heat and light of the lamp, but they are also subject to artificially produced atmospheric humidity. This humidity is desirably produced with the aid of water supplied to another compartment 52 in the tank 44 supplied from the aforesaid water conveying pipe 45. Water flows from this compartment 52 through the pipe 53 into the arcuate tank 54 whose grooved walls are coaxial with the object positioner. The top of the outer wall of the arcuate tank 54 is below the top of the inner wall of this tank so that a thin curtain of water will flow over said outer wall onto the bottom of the upper compartment 2 which is also the top of the lower compartment 1. The heat within the compartment 2 will act upon the water discharged from the tank 54 to produce the desired humidity, it being understood, however, that the water ejected from the spraying nozzles also cooperates with the generator in helping to produce the desired humidity.

A motor 19' drives a blast fan 55 which is arranged to discharge air into a conduit 56 and from this conduit either through a port 57 in the conduit or into a chamber 58 from which the air is discharged. A belt 59 is shown as the preferred form of driving connection between the motor and fan. The chamber 58 contains a series of canvas water absorbing curtains 60 which dip, at their lower ends, into a bath of water 61, the water soaked curtains serving to cool the air passing through the chamber 58. The air discharged from the chamber 58 is passed through a conduit 62 which discharges into an arcuate chamber 63 and from this latter chamber the air emerges through an arcuate slot 64 into the casing compartment 2. The chamber 63 is arranged in the same circle with the shield 47, 48 and desirably completes a geometrical circle with this shield. A thermo-motive device, preferably inclusive of a piston 65 operating in a cylinder 65′ that contains fluid which contracts and expands to move the piston, is arranged within the place surrounded by the chamber 63 and the shield 47, 48 and operates to open or close the swimming valve 66, located in the conduit 56, the valve 66 being closed when the temperature within the casing compartment 2 is sufficiently low and being opened when this temperature is to be reduced. The valve is hinged, as indicated at 67, and is provided with an arm 68 which carries a pin 69. This pin is confined between two jaws 70 which are mounted upon an armature 71 of a magnet 72. The energizing circuit of the magnet includes a suitable generator 73, the master switch 74, and a control switch which is inclusive of two serially related terminals 75 and 76 and a body of mercury 77, these terminals being carried by a tube 78 in which said mercury is contained and projected into the bore of the tube. Said tube is mounted to turn upon a shaft 79 disposed between its ends, the tube being adapted to be turned to one position in which the mercury therein will connect said contacts to close the magnet 72 to open the valve 66 and being adapted to be turned to an alternative position in which the circuit of said magnet will be opened to permit the spring 80 to retract the armature and close the valve 66. A tube 78 is governed in its position by a fluid operated device which is inclusive of a flexible shaft 81 which is pulled and pushed upon by the piston 65 and which operates a plunger 82 which is adapted for lifting engagement with the arm 83. This arm is connected by means of a link 84 with one end of the bell crank lever 85 whose other end carries the tube 78. When the temperature has risen sufficiently, the piston 65 is moved to the right with the result that the arm 83 is lifted and the tube 78 is turned to a position in which the mercury 77 will connect the contact 75, 76 to energize the magnet 72 which thereupon attracts its armature 71 which thereupon serves to move the valve 66 counterclockwise to enable the fan 55 to blow air into the chamber 63. When the temperature is sufficiently reduced, the spring 86 serves to depress the arm 83 to place the tube 78 in a circuit opening position where-upon the spring 87 will retract the armature 71 and reverse the position of the valve 66. An abutment 88 is located on the line that coincides with the mid position of the arm 83. A spring 89 is interposed between this abutment and the adjacent end of the arm 83. This spring serves to quickly complete the final portion of each movement of the tube 78.

I desirably provide an arcuate chamber 90 in the bottom of the casing compartment 2, and in the general region of the doors 50, 51 and opposite the shield 47, 48, this arcuate chamber having an arcuate outlet slot 91. A fan 92, constantly driven by the motor 19′, serves to keep up a constant current of cooling air that flows through the chamber 90 and serves to keep the front of the compartment 2 sufficiently cool to protect the operator.

In Fig. 11, the motors 19, 19′ are shown as being respectively provided with switches 93, 94 for establishing their connection with the generator 73. The arc lamp 46 is shown as being provided with a switch 95 for the same purpose.

In the embodiment of the invention illustrated, the lamp 46 is vertically adjustable. The frame portion 96 of the lamp is carried upon one end of the cable 97 which passes over pulleys 98 that are mounted upon a bracket 99 of loop form. This bracket is supported upon the upper end of an upright rod 100 which is supported upon the floor of the casing compartment 1. The cable 97 has an eye 101 upon its other end which engages a hook 102 to hold the lamp in its lowermost position and a hook 103 to hold the lamp in its uppermost position, the lamp in its latter position being sufficiently high to enable it to be reached for trimming, etc. The hub portion of the spider 5′ is sufficiently above the bottom of the casing compartment 2 to prevent the lamp from descending into the water in this casing compartment in the event of the failure to attach the cable to the hook 102, the water being prevented from exceeding the given upper level in said casing compartment. The upper limiting level of the water in the casing compartment 1 is defined by the overflow pipe 104 whose upper end is located at the desired level and whose lower end discharges into a tank 105 through a cleansing strainer 106. The water used in wetting the objects undergoing test and for artificially furnishing atmospheric humidity finds its way to the tank 105 by way of the pipe 104 from which tank the water is pumped to the tank 44 through the pipe 45 by means of the pump 107 which is driven by the motor 19′. Water also flows from the casing compartment 1 through the pipe 108 into the cooling chamber 58, the water in this chamber being held to an upper limiting level by means of a pipe 109 whose upper end is located at this level and whose lower end discharges into the tank 105 through another cleansing strainer 110.

The shaft carrying the gear 27 and pinion 28 has a hand wheel 111 fixed thereon whereby the spur gear 29 may be turned independently of the motor 19 in order that the object positioner may be adjusted to any selected place for any particular purpose. In order that the spur gear 29 may thus be turned independently of the motor 19, the gear elements 27 and 28 are carried by a bracket 112 which is pressed upon by a spring 113 normally to hold the gear 27 in mesh with the pinion 26 but permitting these gear elements to be unmeshed. For convenience, the bracket 112 is provided with a pivoted handle 114 in order that it may be shifted in opposition to the force of the spring 113. If it is desired to hold the gear elements 26, 27 unmeshed, the handle may be turned to an upright position and caught behind the rib 115 upon the interior of the casing compartment 1. Thermometers 116 may be provided at suitable places to indicate the temperature within the casing compartment 2.

Changes may be made without departing from the invention.

Having thus described my invention, I claim:

1. Apparatus for testing the effect of weather upon objects including, in association, means for wetting the object to be tested with water, a lamp producing artificial light containing rays whose effect is to be tested and arranged to direct its light upon the object, a shield for preventing the light from striking the object while water is being placed upon the object, and a positioner for the object being tested, said positioner and shield being in movable relation to enable the object to be subject to the wetting means without being subject to the light and to the light without being subject to the wetting means.

2. Apparatus for testing the effect of weather upon objects including, in association, means for wetting the object to be tested with water, a lamp producing artificial light containing rays whose effect is to be tested and arranged to direct its light upon the object, an artificial source of atmospheric humidity arranged to affect the object, a shield for preventing the light from striking the object while water is being placed upon the object, and a positioner for the object being tested, said positioner and shield being in movable relation to enable the object to be subject to the wetting means without being subject to the light and to the light without being subject to the wetting means.

3. Apparatus for testing the effect of weather upon objects including, in association, means for spraying the object to be tested with water, a heat generating lamp producing artificial light containing rays whose effect is to be tested and arranged to direct its light and heat upon the object, a shield for preventing the light from reaching the object and inclusive of a chamber containing cooling fluid, and a positioner for the object being treated, said positioner and shield being in movable relation to enable the object to be subject to the spraying means without being subject to the light and to be subject to the light without being subject to the spraying means.

4. Apparatus for testing the effect of weather upon objects including, in association, a supporting means upon which an object to be treated may be removably supported, means for directing the water on the object at a substantially uniform pressure throughout the length of the object, piping for conveying water to the object so supported, and a lamp producing light containing rays whose effect is to be tested and arranged to direct its light upon the object removably located on said supporting means and made wet by water conveyed through the piping.

5. Apparatus for testing the effect of weather upon objects including, in association, a support for the objects including clamping means for retaining the objects thereon, means for wetting an object on the support that is to be tested with water, a lamp producing artificial light containing rays whose effect is to be tested and arranged to direct its light upon the object and a shield disposed between the object on the support and the lamp, the lamp being adjustable relatively to the shield to bring the object undergoing test into and out of the path of light flowing from the lamp.

6. Apparatus for testing the effect of weather upon objects including, in association, a support for the objects, means for artificially humidifying air, an enclosure for receiving the artificially humidified air, means for directing the artificially humidified air from the enclosure on an object upon said support, and a lamp disposed within the support producing light containing rays whose effect is to be tested and arranged to direct its light upon the thus humidified object on the support.

7. Apparatus of the class described, including in association, a lamp constituting a source of ultra-violet radiation, a holder for the objects to be treated arranged to maintain said objects at a substantially fixed distance from said lamp, means for wetting said articles and controlling means for said lamp and wetting means for alternately subjecting said objects to the effects of said lamp and said wetting means.

8. Apparatus of the class described, including in association a lamp constituting a source of ultra-violet radiation, a holder for the objects to be treated to exposure to radiation from the lamp, means for wetting said objects and means controlling the exposure of said object to the effect of said lamp without being subject to the wetting means, and to the effect of said wetting means without being subject to the lamp.

9. Apparatus of the class described, including in association a lamp constituting a source of ultra-violet radiation, a holder for supporting a plurality of objects to be tested in an annular series substantially concentric with respect to said lamp, water-spraying means for periodically wetting the objects, and means for rendering said lamp ineffective with respect to said objects during the wetting periods.

10. Apparatus of the character described, including in association a rotary holder arranged to position a plurality of objects to be tested in an annular series substantially equi-distant from the center of the series, a lamp positioned in the center of said series and arranged to subject the objects to ultra-violet radiation as the holder rotates, means for rendering said lamp intermittently ineffective with respect to said objects, and means for wetting the objects intermittently during the period when said lamp is rendered ineffective.

11. Apparatus of the character described, including in association, a rotary holder arranged to position a plurality of objects to be tested in an annular series substantially equi-distant from the center of the series, a lamp positioned in the center of said series and arranged to subject the objects to ultra-violet radiation, means for rendering said lamp intermittently ineffective with respect to said objects, means for wetting the objects intermittently during the period when said lamp is rendered ineffective, and means for subjecting said objects to artificially humidified air.

12. Apparatus of the character described, including in association a lamp constituting a source of artificially produced ultra-violet radiation, rotary holding means concentrically disposed with relation to said lamp and arranged to rotate a series of objects to be tested in equi-distant relation to said lamp, a spraying device for successively wetting said objects as they are rotated by said holder, and means for rendering said lamp ineffective with respect to those objects which are being wetted during the wetting operation.

13. Apparatus of the character described including in association a relatively movable positioner for the articles to be treated and a lamp constituting an artificial source of ultra-violet radiation to the effect of which said articles are adapted to be subjected, and means for intermittently controlling the exposure of the articles to said source of ultra-violet radiation while said articles and lamp are in relative movement.

14. Apparatus of the character described including in association, a lamp constituting an artificial source of ultra-violet radiation arranged to direct its radiation upon the articles to be treated, a shield arranged to shade radiation from said lamp to prevent the exposure of the articles to said radiation, and a positioner for the articles to be treated movable with respect to said lamp and shield to alternately subject the articles alternately to exposure to said radiation and to the shade of said shield.

15. Apparatus of the class described including in association a stationary lamp constituting an artificial source of ultra-violet radiation, a stationary shield positioned adjacent said lamp for shading a portion of the radiation from said lamp, and a traveling positioner for the objects to be treated and arranged to travel adjacent said lamp and behind the shield for the purpose of exposing the objects alternately to radiation and the shade of said shield.

In witness whereof, I hereunto subscribe my name.

CLARENCE W. JAMESON.